United States Patent
Koike

(10) Patent No.: US 6,867,762 B2
(45) Date of Patent: Mar. 15, 2005

(54) RECORDING MEDIUM, PROGRAM EXECUTING SYSTEM, AND PROGRAM EXECUTING DEVICE

(75) Inventor: Akira Koike, Tokyo (JP)

(73) Assignee: Sony Computer Entertainment Inc. (JP)

( * ) Notice: Subject to any disclaimer, the term of this patent is extended or adjusted under 35 U.S.C. 154(b) by 216 days.

(21) Appl. No.: 10/012,797

(22) Filed: Oct. 30, 2001

(65) Prior Publication Data

US 2002/0093524 A1 Jul. 18, 2002

(30) Foreign Application Priority Data

Oct. 30, 2000 (JP) ....................................... 2000-330586
Oct. 29, 2001 (JP) ....................................... 2001-330340

(51) Int. Cl.⁷ ................................................ G09G 5/00
(52) U.S. Cl. .......................... 345/161; 74/471; 273/148
(58) Field of Search ................................ 345/156–163; 341/20; 463/38; 74/471; 273/148

(56) References Cited

U.S. PATENT DOCUMENTS

| | | | |
|---|---|---|---|
| 5,049,079 A | | 9/1991 | Furtado et al. |
| 5,452,615 A | | 9/1995 | Hilton |
| 5,589,828 A | * | 12/1996 | Armstrong .................... 341/20 |
| 5,589,854 A | * | 12/1996 | Tsai ............................ 345/161 |
| 5,643,087 A | * | 7/1997 | Marcus et al. ................. 463/38 |
| 5,706,027 A | * | 1/1998 | Hilton et al. ................ 345/156 |
| 5,724,068 A | * | 3/1998 | Sanchez et al. ............. 345/161 |
| 5,828,363 A | | 10/1998 | Yaniger et al. |
| 6,104,382 A | * | 8/2000 | Martin et al. ................ 345/161 |
| 6,154,198 A | * | 11/2000 | Rosenberg ................... 345/161 |
| 6,429,849 B1 | * | 8/2002 | An et al. ..................... 345/161 |

FOREIGN PATENT DOCUMENTS

| | | |
|---|---|---|
| JP | 04-148278 A1 | 5/1992 |
| JP | 11-195140 A1 | 7/1999 |
| JP | 2000-157745 A1 | 6/2000 |

* cited by examiner

Primary Examiner—Dennis-Doon Chow
Assistant Examiner—Srilakshmi Kumar
(74) Attorney, Agent, or Firm—Lerner, David, Littenberg, Krumholz & Mentlik, LLP

(57) ABSTRACT

The present invention provides a game for throwing pottery using clay placed on a potter's wheel with hands on a screen operated by a controller. The game program judges whether or not there has been operating input of left and right sticks (joysticks) or the like for operating hands displayed on the screen as to clay on a potter's wheel displayed on the screen, and in the event that there has been such operating input, determines the magnitude of force corresponding to the input value, calculates the amount of deformation of the clay from the determined magnitude of force, and displays the next image.

26 Claims, 19 Drawing Sheets

RECORDING MEDIUM, PROGRAM EXECUTING SYSTEM, AND PROGRAM EXECUTING DEVICE

CROSS-REFERENCE TO RELATED APPLICATIONS

The present application claims priority from Japanese Application Nos. 2000-330586 filed Oct. 30, 2000 and 2001-330340 filed Oct. 29, 2001, the disclosures of which are hereby incorporated by reference herein.

BACKGROUND OF THE INVENTION

The present invention relates to a recording medium storing a program wherein a game proceeds by accurately controlling force applied to an object displayed on a screen or the like with hands or the like displayed on the screen, the method thereof, and a program executing system and program executing device whereby the program is executed.

Entertainment apparatuses capable of executing game programs such as video games or the like have become commonplace. An operating device and a display device are electrically connected to the entertainment apparatus.

With such entertainment apparatuses, characters displayed in a display screen are provided with strength in the arms, legs, etc., thereof by operations made by the operator (user or player) of the operating devices, thereby causing the characters to perform various actions such as dashing, jumping, kicking punching, and so forth. This allows the characters to defeat enemy characters, avoid dangers, and so forth. The game program is thus executed, carrying out the story, object, etc., thereof.

With conventional game programs, self-resetting push buttons were used for determining the magnitude of force. Such push buttons are in the off state unless pressed, and are in the on state when pressed. Accordingly, the magnitude of force is determined by the amount of time that the button is pressed (the duration of the on state time), or by displaying a bar graph on the screen which changes in length with time, and pressing the button at a timing when the length thereof matches the appropriate magnitude of force.

However, such push button switches can do no more than switching between on and off, so the difficulty in realizing delicate control of force with such on/off switch-over switches has been a problem.

Now, there are examples of using pressure-sensitive elements such as piezo-electric devices in so-called arcade games, for determining the magnitude of force. However, these applications are no more than simple usage methods wherein, for example, a pseudo sandbag imitating those used for boxing practice is fashioned with a pressure-sensitive device assembled therein, and the force of striking the pseudo-sandbag serving as the operating device (input device) is converted into numerical values based on the pressure/electric-signal converting functions of the pressure-sensitive device, and displayed on a display device.

SUMMARY OF THE INVENTION

The present invention has been made in light of the above problems, and accordingly, it is an object thereof to provide a recording medium storing a program, the method thereof, and a program executing system and program executing device whereby the program is executed, wherein the magnitude of force used in a game of a program being executed can be controlled in a more precise manner with simpler operations.

The recording medium according to the present invention stores a program for executing processing with operating output values output as commands at the time of operating an operating lever, the program including code for determining a force applied to an object displayed on a screen from force-applying means displayed on the screen according to the operating output values output by operating the operating lever.

The present invention includes determining a force applied to an object displayed on a screen from force-applying means according to operating output values output by operating the operating lever, and accordingly, the operator can control the magnitude of force in a more precise manner with the simple operation of operating an operating lever.

In this case, the force may be determined according to the amount of change per unit time of the operating output values, so as to generate a force matching the senses of the operator. Also, the deformation amount of the object may be determined by a force determined according to the operating output values, so as to deform the object very slightly, and so forth.

For example, an arrangement wherein the object is clay and the force-applying means are hands, this allows for a pottery-making game, or the like. Further, the force-applying means may be human hands or tools used by humans, and the object may be such that is readily deformed by the hands or the tools.

The program (method) according to the present invention for executing processing with operating output at the time of operating an operating lever as commands includes determining a force applied to an object displayed on a screen from force-applying means displayed on the screen according to operating output values output by operating the lever, and accordingly, the magnitude of the force can be controlled in a more precise manner, with simple operations.

The program executing system according to the present invention includes a program executing device for reading and executing programs stored in a recording medium; an operating lever connected to the program executing device for outputting operating requests by an operator to the program executing device; and a display device having a screen for displaying images output from the program executing device; the program executing device including a storing unit storing a program for executing processing with operating output values output as commands at the time of operating the operating lever, the program including code for determining a force applied to an object displayed on the screen of the display device from force-applying means displayed on the screen according to the operating output values output by operating the operating lever; and an executing unit for reading and executing the program stored in the storing unit.

Accordingly, with the present invention the operator can control the magnitude of force in a more precise manner with the simple operation of operating an operating lever.

The program executing device according to the present invention, which is connectable to an operating lever for outputting operating requests by an operator, and a display device having a screen for displaying images, includes a storing unit storing a program for executing processing with operating output values output as commands at the time of operating the operating lever, the program including code for determining a force applied to an object displayed on the screen of the display device from force-applying means displayed on the screen according to the operating output values output by operating the operating lever; and an executing unit for reading and executing the program stored in the storing unit.

Accordingly, the operator can control the magnitude of force in a more precise manner with the simple operation of operating an operating lever.

DETAILED DESCRIPTION

Embodiment of the present invention will be described with reference to the drawings.

Figure 1:
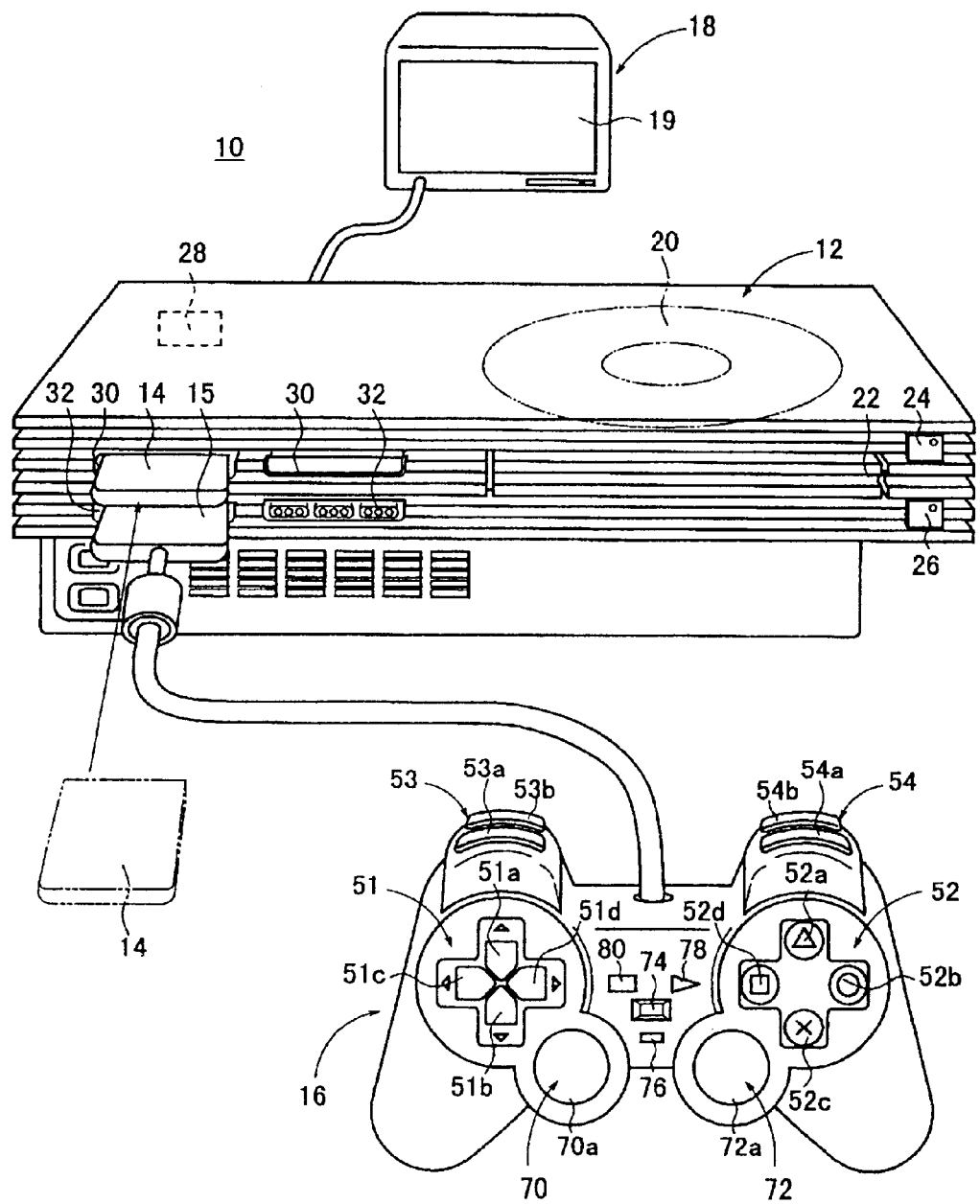
FIG. 1 is a configuration diagram of an entertainment system wherein an embodiment of the present invention has been applied.

FIG. 1 illustrates a schematic external view of an entertainment system 10, as an example of a program executing system to which an embodiment of the present invention has been applied.

This entertainment system 10 is basically configured of an entertainment device 12 serving as a program executing device having functions for executing various programs and so forth, a memory card 14 which is a card-type storing device (external memory) which is detachable form and attachable to the entertainment device 12, an operating device (controller) 16 which is detachably connected to the entertainment device 12 by a connector 15 for externally inputting operating requests, which are instructions, from an operator (user or player) to the entertainment device 12, and a display device (monitor or display) 18 such as a television receiver or the like for being supplied with picture and audio signals output from the entertainment device 12 and displaying the pictures while outputting the audio. Such an entertainment system 10 is integrally formed.

The entertainment device 12 is of a shape with flat rectangular parallelepipeds placed one upon another, with the front panel thereof having a disk tray 22 which moves forwards and backwards to serve as a disk mounting unit where optical disks 20 (program data recording media) are mounted, a reset switch 24 for arbitrarily resetting programs and the like currently being executed and so forth, an open button 26 for extracting the disk tray 22, two insertion slots 30 for memory cards 14, two controller terminals 32 wherein connectors 15 for controllers 16 are inserted, and so forth, while the rear side thereof has a power switch 28, an unshown AV (Audio Visual) multi-output terminal which is a picture and audio output terminal connected to a monitor 18 via an AV cable, and so forth.

The entertainment device 12 has various functions, such as control functions for reading programs from optical disks 20 serving as recording media, such as CD-ROMs, DVD-ROMs, etc., wherein programs and data for computer games (video games) are recorded, and executing the games, thereby displaying characters and scenes on the monitor 18, as well as various control functions for reproducing pictures from DVDs (Digital Versatile Disks or Digital Video Disks) and playing music from CDDA (Compact Disk Digital Audio), and other like optical disks 20. The entertainment device 12 also has functions for executing program obtained by communication via communication networks and the like. Three-dimensional computer graphics pictures generated by the entertainment device 12 are displayed on the screen 19 of the monitor 18 serving as the display device while executing the game program.

In this case, signals from the controllers 16 are also processed by one of the aforementioned control functions of the entertainment device 12, and the contents thereof are reflected in, for example, the movement of character objects (hereafter simply referred to as "characters"), forces which characters exert on solids, fluids, semi-fluids, and other objects, switching over of characters, switching over of scenes, and so forth on the screen 19 of the monitor 18.

The controller 16 has first and second operating portions 51 and 52 formed to the left and right of the center on the upper face thereof, with third and fourth operating portions 53 and 54 formed on the sides thereof, and a left stick 70 and a right stick 72 serving as joysticks for making analog operations to the right and left of the front side of the upper face. The left and right sticks 70 and 72 serving as operating levers generate output according to the direction that each are inclined in the X-Y orthogonal direction, and the degree of inclination (i.e., operation output values). For example, these have the functions of moving a character displayed on the screen 19 of the monitor 18 to the right and left, forwards and backwards, by operating the left stick 70, or adjusting the magnitude of force applied to an object by the left and right hands of the character, by operating the left and right sticks 70 and 72, and so forth.

While not shown in the drawings, the left and right sticks 70 and 72 are provided with vibrating motors in the driving portions thereof, such that vibrations are applied to the left and right sticks 70 and 72 by instructions of the program.

The first operating portion 51 is a pressing operating portion for providing actions to characters and the like displayed on the monitor 18 for example, and the functions thereof are set by the program or the like recorded in the optical disk 20. The first operating portion 51 is formed of four operating keys (also called "direction keys") 51a, 51b, 51c, and 51d having functions for moving characters and the like up, down, left, right, and so forth. The direction key 51a is also referred to as the "up" key, the direction key 51b as the "down" key, the direction key 51c as the "left" key, and the direction key 51d as the "right" key.

The second operating unit 52 has four cylindrical operating buttons 52a, 52b, 52c, and 52d, for pressing operations. The tops of the operating buttons 52a through 52d are marked with the identification marks of "triangle (Δ)", "circle (○)", "cross (X)", and "square (□)", so the operating buttons 52a through 52d are also referred to as "triangle button 52a", "circle button 52b", "cross button 52c", and "square button 52d".

The functions of the operating buttons 52a through 52d on the second operating unit 52 are set by the program or the like recorded in the optical disk 20. For example, functions for moving the left arm, right arm, left leg, and right leg, of the character, are appropriated to the operating buttons 52a through 52d.

The third and fourth operating portions 53 and 54 are of approximately the same structure, both having two pressing operating buttons arrayed vertically, i.e., an operating button 53a (also referred to as the "L1 button") and an operating button 53b (also referred to as the "L2 button"), and an operating button 54a (also referred to as the "R1 button") and an operating button 54b (also referred to as the "R2 button"). The functions of the third and fourth operating portions 53 and 54 are also set by the program or the like recorded in the optical disk 20. For example, the third and fourth operating portions 53 and 54 are appropriated with functions for causing the characters to perform special actions, or functions for changing the characters.

Figure 2:
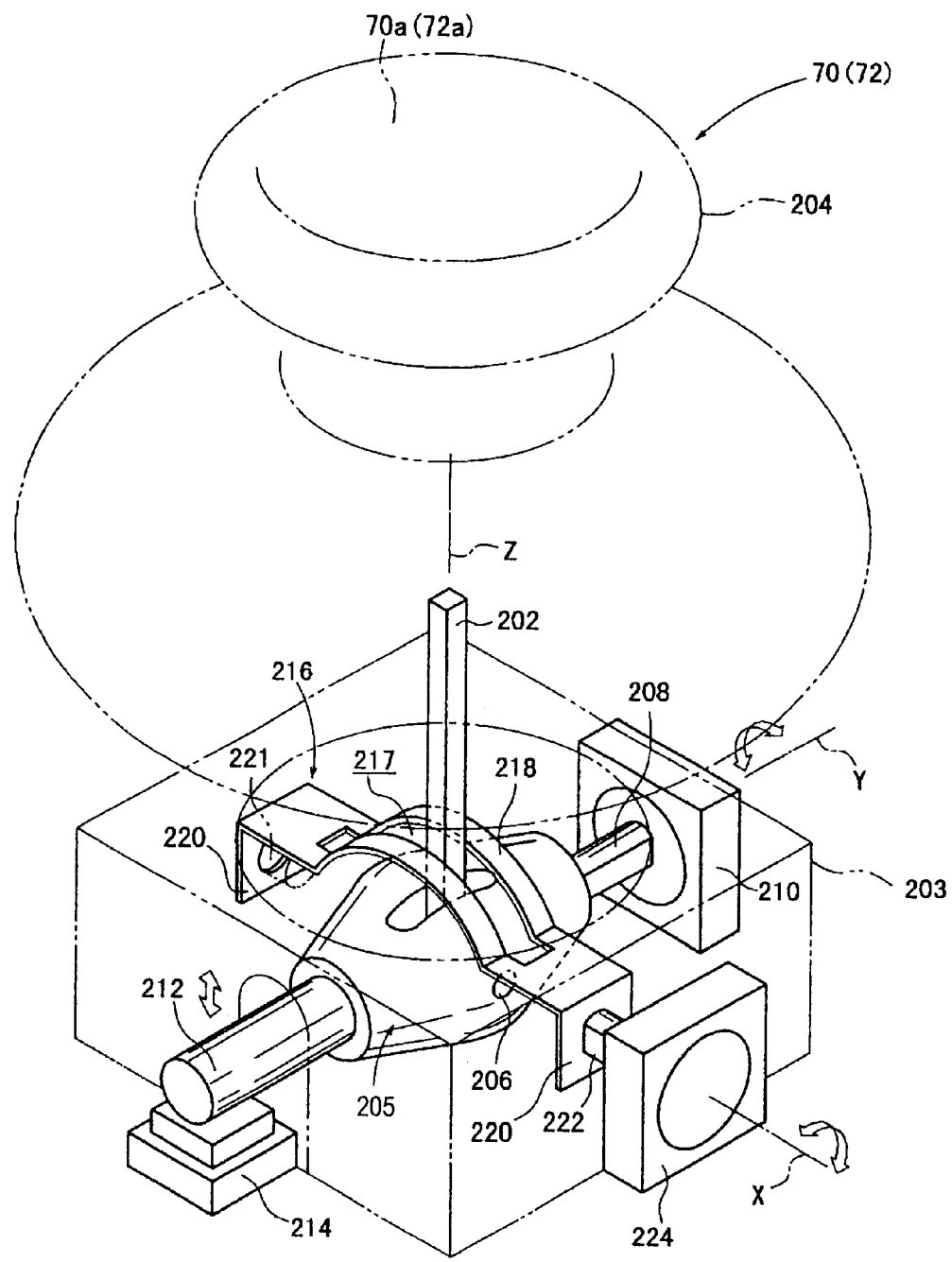
FIG. 2 is a perspective view illustrating the mechanical internal configuration of a left or right stick.

As shown in FIG. 2, the left and right sticks 70 and 72 are of a configuration wherein a resin cap 204 is fit into one side of an operating lever 202 making up a joystick.

The other end of the operating lever 202 is fit with a shaft 206 which is uniaxial with an X-axis provided on a body portion 205 within a casing 203, such that the operating lever 202 rotates by a predetermined angle as to the X-axis on the shaft 206.

The body portion 205 is formed parallel to a Y-axis which is orthogonal to the X-axis, with a rotating shaft portion 208 at one end side thereof being fit to a variable resistor 210 for the Y-axis. Rotating the operating lever 202 on the Y-axis causes the movable point of the variable resistor 210 to rotate a predetermined angle as to the Y-axis. A pressure-sensitive switch 214 (pressure-sensitive operating unit), of which structure will be described later, is situated below a rotating shaft unit 212 rotatably supported by the side wall of the casing 203 at the other end side of the body portion 205.

The body portion 205 is configured such that, in the event that the operating lever 202 is not being operated by an operator or the like, the operating lever 202 returns by force of an unshown spring to the neutral position, i.e., the direction at which the operating lever 202 points in the direction of the Z-axis from the point of origin.

A frame 216 formed of a thin frame extending in the X-axial direction is positioned above the body portion 205 so as to be distanced therefrom. The frame 216 is configured of an arched portion 218 with a slit 217 formed therein, flat portions connecting from either side of the arched portion 218, and bent portions 220 which bend downwards from the flat portions at right angles.

One of the bent portions 220 is rotatably supported to the casing 203 by a supporting member 221, and the other of the bent portions 220 has a rotating shaft portion 222 parallel to the X-axis attached thereto. This rotating shaft portion 222 is engaged with an X-axial variable resistor 224. Rotating the operating lever 202 on the shaft 206 causes the frame 216 to also rotate a predetermined angle as to the X-axis, so that consequently the variable resistor 224 rotates a predetermined angle via the rotating shaft portion 222.

The left and right sticks 70 and 72 thus configured are rotated by the cap 204 with the thumb or the like in 360°, and operating the operating lever 202 on the X-axis for example causes the X-axial variable resistor 224 to be rotated, and operating the operating lever 202 on the Y-axis causes the Y-axial variable resistor 226 to be rotated.

Also, the left and right sticks 70 and 72 respectively have functions of operating buttons 70a (also referred to as the "L3 button") and 72a (also referred to as the "R3 button") serving as the fifth and sixth operating portions for pressing operations, and pressing the L3 and R3 buttons 70a and 72a operates the pressure-sensitive switch 214 via the rotating member 212.

Rotationally operating the left and right sticks 70 and 72 allows command signals (operating output values) to be input which enable analog motions such as, for example, rotating a character or the like while in motion, or moving while changing the speed thereof, or further changing the state thereof.

Figure 3:
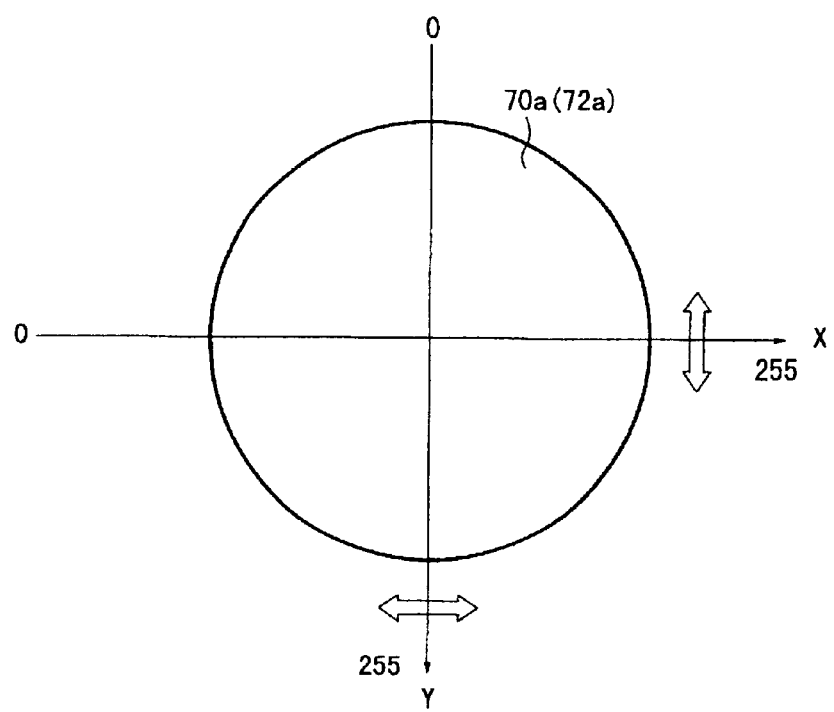
FIG. 3 is an explanatory diagram of operating output values from operation of the left or right stick.

Now, the operating output value obtained from the variable resistors 210 and 224 by operating the left and right sticks 70 and 72 can be obtained as follows. As shown in FIG. 3, the value y in the Y-axial direction is from 0 to 255 in the direction from up toward down, and the value x in the X-axial direction is from 0 to 255 in the direction from left toward right. Also, the inclination (operating angle) L of the left and right sticks 70 and 72, i.e., the direction of the operating levers 202, can be obtained by the expression $L=(x^2+y^2)^{1/2}$. In other words, the operating angle L is obtained by adding the square of the value x to the square of the value y, and then obtaining the ½th power of the sum.

Figure 4:
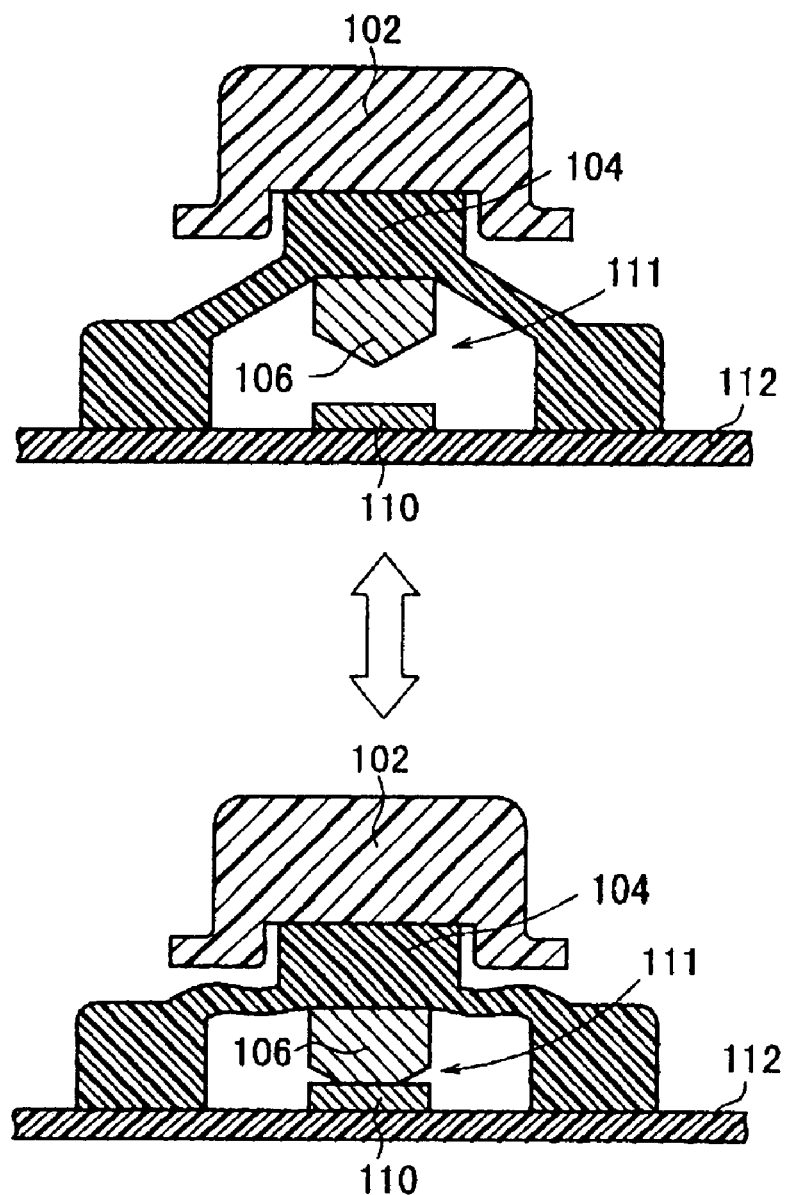
FIG. 4 is a cross-sectional diagram provided for description of the actions of a pressure-sensitive device.
Figure 5:
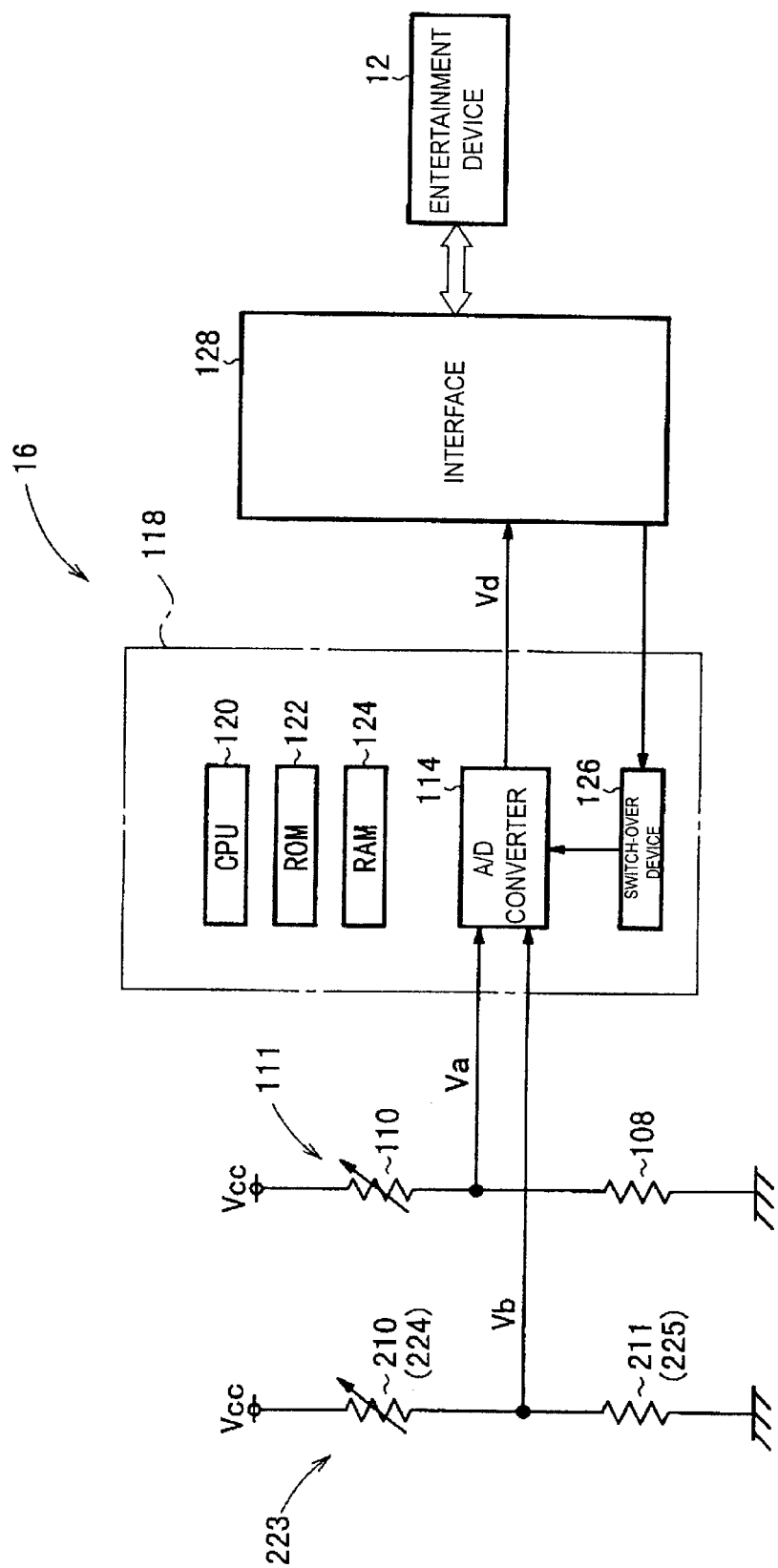
FIG. 5 is a circuit block diagram provided for description of the actions of a controller.

The rear sides of each of the direction keys 51a through 51d making up the first operating portion 51, the operating buttons 52a through 52d making up the second operating portion 52, the L1 and L2 buttons 53a and 53b and the R1 and R2 buttons 54a and 54b making up the third and fourth operating portions 53 and 54, the L3 and R3 buttons 70a and 72a making up the fifth and sixth operating portions (representatively referred to as "operating element 102"), as well as the pressure-sensitive switches 214 for the L3 and R3 buttons 70a and 72a (also referred to as "operating element 102"), are provided with an elastic electroconductive member 106 which is wide at the base and comes to a point at the apex which is at the center thereof, via an insulating elastic member 104, as shown in FIGS. 4A–4B and 5. A resistor 110 with one end thereof connected to a voltage source Vcc and the other end thereof connected to a fixed resistor 108 is opposed at each position facing each electroconductive member 106. The resistor 110 is disposed on an insulating substrate 112. The other end of the fixed resistor 108 is grounded.

In this case, in the event that the direction keys 51a through 51d, the operating buttons 52a through 52d, the L1 and L2 buttons 53a and 53b, the R1 and R2 buttons 54a and 54b, and the L3 and R3 buttons 70a and 72a (each being pressure-sensitive operating units, hereafter referred to as "operating element 102") are pressed, the electroconductive member 106 comes into contact with the opposing resistor 110, and the apparent resistor value of the resistor 110 changes corresponding to the area of contact between the resistor 110 and the electroconductive member 106 according to the pressure applied thereto. The divided voltage value (analog signal) Va between the resistor 110 and the resistor 108 changes, and this becomes the input signals to an A/D converter 114. The analog signal Va is the output value obtained by operating an operating element 102 serving as a pressure-sensitive operating portion, and thus is also referred to as "operating output value Va".

Thus, a pressure-sensitive element 111 is formed of an electroconductive member 106 and a resistor 110, and the electrical resistance values of the pressure-sensitive element 111 change according to the pressing force applied by the operating element 102.

Note that FIGS. 4A and 4B illustrate the action of the pressure-sensitive element 111 serving as the element for outputting signal output proportionate to the pressing force, and FIG. 5 illustrates the configuration of the principal components of the controller 16.

Actually, in addition to the pressure-sensitive element 111, variable resistors 210 and 224 and resistors 211 and 225 operated by the left and right sticks 70 and 72 and making up a divided voltage output circuit 223 are also connected to the input side of the A/D converter 114 with the divided voltage value Vb thereof (an analog signal, also referred to as "operating output value") also being input.

In this case, an unshown multiplexer which is a switch-over device is inserted at the input side of the A/D converter 114, such that the output of all sixteen voltage output elements relating to the direction keys 51a through 51d, the operating buttons 52a through 52d, the L1 and L2 buttons 53a and 53b, the R1 and R2 buttons 54a and 54b, the L3 and R3 buttons 70a and 72a, and the left and right sticks 70 and 72, can be sequentially switched over. Of course, sixteen A/D converters 114 may be used to perform signal professing.

As shown in FIG. 5, the controller 16 has an MPU (Microprocessor Unit) 118 serving as control means. The MPU 118 containing a CPU 120 serving as control means, and ROM 122 and RAM 124 mutually connected therewith. Also, the MPU 118 is provided with a switch-over device 126 of which actions are controlled by the CPU 120, and the above-described A/D converter 114. Analog signals (voltage) Va output from the output terminal of the resistor 110, or analog signals (voltage) Vb output from the output terminal of the variable resistor 210 (224) are input to the A/D converter 114, and sequentially converted into digital signals Vd. The digital signals Vd are signals corresponding to the analog signals Va and Vb, so the digital signals Vd are also referred to as "operating output value Vd".

The digital signal Vd output from the A/D converter 114 is sent to the entertainment device 12 via an interface 128 provided on an interior substrate in the controller 16. The motions of game characters on the screen 19 for example, or changing of the magnitude of the force applied to objects such as clay or the like with hand displayed on the screen 19, etc., are executed based on the digital signals Vd.

The change in level of the analog signal Va output from the output terminal of the resistor 110 corresponds to the change in the pressing force applied from the operating element 102, as described above. Also, the change in level of the analog signal Vb output from the output terminal of the resistors 210 and 224 corresponds to the change in the operating angle L of the left and right sticks 70 and 72. Thus, the digital signal Vd output from the A/D converter 114 corresponds to the pressing force applied by the user (operator or player) to the operating elements 102 and the operating angle L of the left and right sticks 70 and 72. Controlling the movement and the like of game characters with digital signals Vd having such correlation to the pressing operation by the operator and the lever operation of the left and right sticks 70 and 72 allows movements to be realized which are smoother in an analog manner than those realized by control with the binary digital signals of "1" and "0".

Now, the controller 16 is constructed so as to control the switch-over device 126 via the interface 128 by control signals sent from the entertainment device 12, based on the program recorded on the optical disk 20. That is to say, at the time of executing the program recorded on the optical disk 20, control signals are output from the entertainment device 12, specifying, according to the contents of the program, whether to cause the A/D converting unit 114 as means for outputting multi-value digital signals Vd with values from 0 through 255 for example, or to function as means for outputting binary on/off digital signals Vd with the values of "0" and "1". The switch-over device 126 selects and switches over the functions of the A/D converting unit 114 (binary output or multi output) based on these control signals. Accordingly, whether binary output is used or multi-value output is used, is determined by the program.

In FIG. 1, the left and right sticks 70 and 72, and the first and second operating portions 51 and 52, can be switched over from one to another for use. The switching thereof is performed by an analog mode switch 74. In the event that the left and right sticks 70 and 72 also serving as joysticks are selected by the analog mode switch 74, a display portion 76 is lit, thus indicating that the left and right sticks 70 and 72 are in the selected state.

Also provided on the controller 16 are a start button (start switch) 78 for instructing starting of a game, a selection button (selection switch) 80 for selecting the difficulty of the game when starting the game, and so forth.

Figure 6:
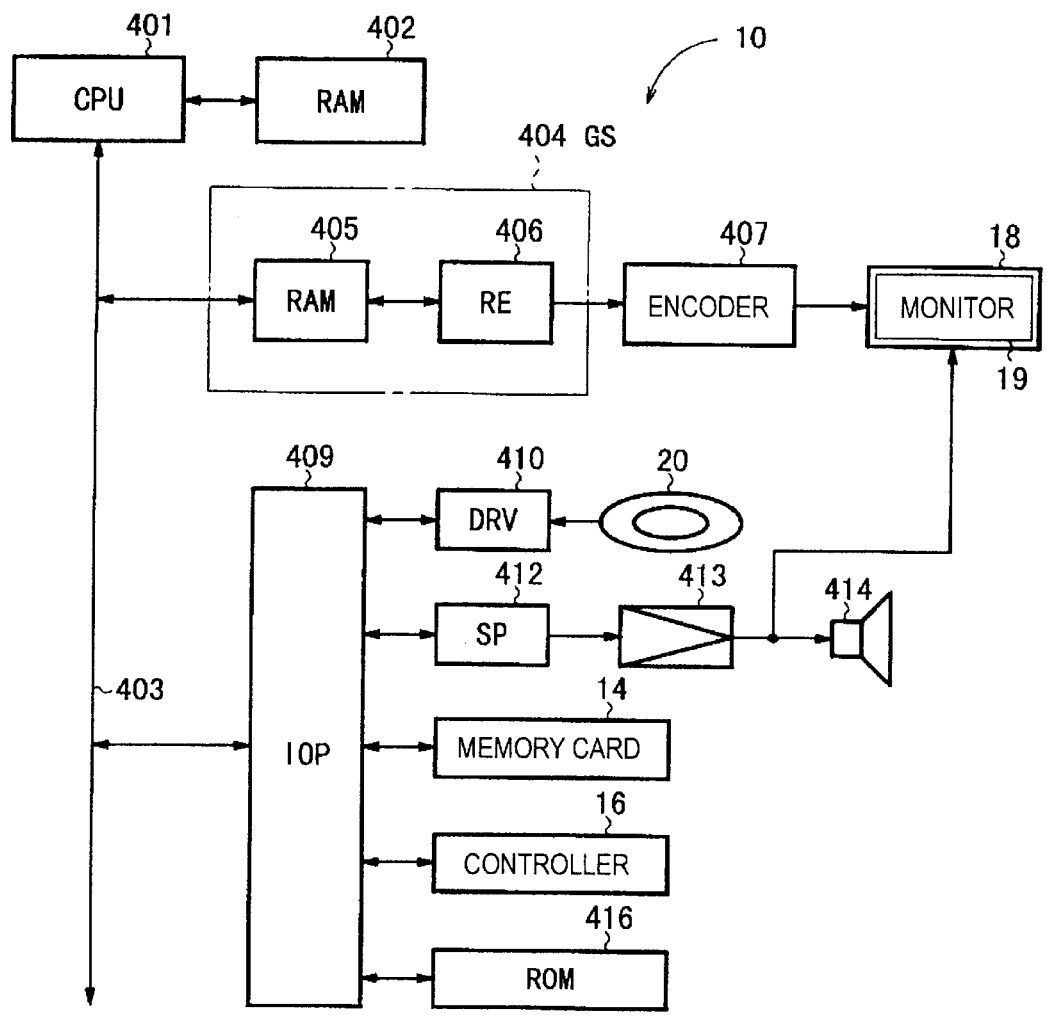
FIG. 6 is a block diagram of an entertainment system.

Next, the internal configuration of the entertainment system 10 shown in FIG. 1 and the general actions thereof will be described with reference to the block diagram shown in FIG. 6.

RAM 402 which is semiconductor memory and a bus 403 are each connected to a CPU 401, which serves as a computer and an executing unit (executing means). In this case, the RAM 402 also functions as a storing unit (storing means) for sequentially storing programs containing data recorded in the optical disk 20. The CPU 401 also functions as an executing unit for reading out programs within the RAM 402 serving as the storing unit or within the optical disk 20 and executing the programs.

A graphic synthesizer (GS) 404 and an input/output processor (IOP) 409 are each connected to the bus 403. Contained in the GS 404 are RAM 405 including a frame buffer, Z buffer, texture memory, etc., and a rendering engine 406 having rendering functions including drawing functions to the frame buffer within the RAM 405.

The GS 404 thus configured is connected to a monitor 18 serving as an external device, via an encoder 407 for converting digital RGB signals or the like for example, into NTSC standard television signals.

Connected to the IOP 409 are a driver (DRV) 410 for reproducing and decoding data recorded in the optical disk 20, a sound processor (SP) 412, a memory card 14 formed of flash memory serving as external memory, the controller 16, and ROM 416 storing an operating system and the like. The SP 412 is connected to a speaker 414 and monitor 18 serving as external devices, via an amplifier 413, thereby supplying audio signals.

Now, the memory card 14 is a card-type external storing device formed of a CPU or gate array and flash memory, and is detachably inserted to an insertion slot 30 of the entertainment device 12 shown in FIG. 1. The partway state of the game, programs for DVD reproduction, and so forth, are stored in the memory card 14.

The controller 16 is for providing commands (binary commands or multi commands) to the entertainment device 12 by pressing the multiple pressure-sensitive operation portions which are the buttons and operating the joysticks arrayed on the controller 16. Also, the driver 410 has a decoder for decoding encoded images based on the MPEG (Moving Picture Experts Group) standard.

Next, how images are displayed on the monitor 18 by operating the controller 16 will be schematically described.

It is to be understood as a presupposition that the object data made up of polygon apex data and texture data and the like recorded on the optical disk 20, and data on the world coordinates WC of this object data, are read in via a driver 410, and are held in the RAM 402 of the CPU 401.

Figure 7:
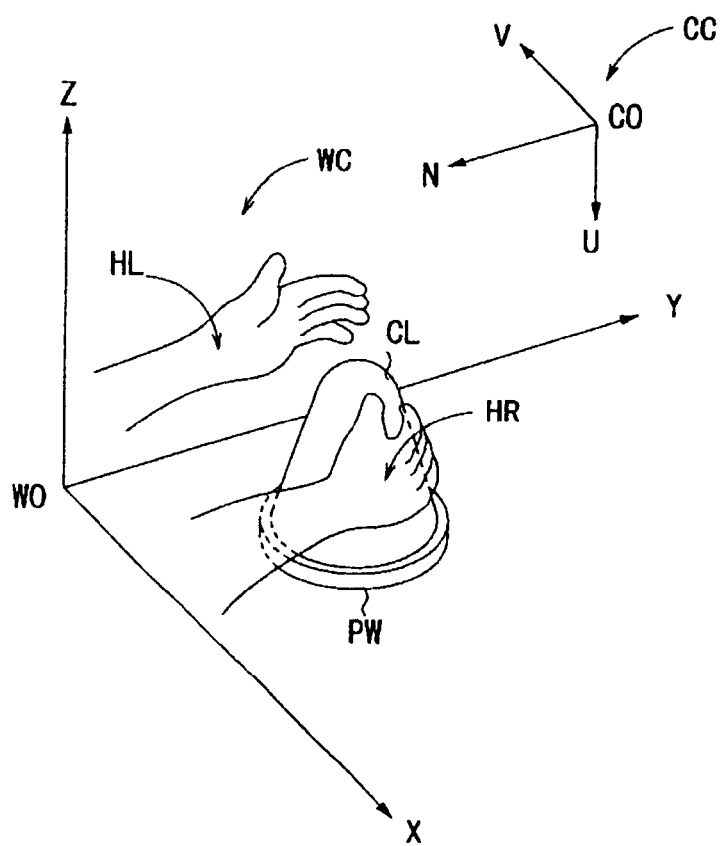
FIG. 7 is an explanatory diagram provided for correlated description of world coordinates and camera coordinates.

FIG. 7 schematically illustrates the state of objects H (HL, HR), CL, and PW of object data being positioned on the three-dimensional world coordinates WC comprising the three orthogonal axes of X, Y, and Z, with the world coordinates point of origin WO. Note that the objects HL and HR represent the left hand object and the right hand object, and hereafter may be referred to as "hands" (including both left hand and right hand) H, "left hand" HL, or "right hand" HR. The object CL represents the clay object, and according hereafter may be referred to as "clay" CL. Also, the object PW represents the potter's wheel object, and according hereafter may be referred to as "potter's wheel" PW.

Once instructions for the later-described viewpoint changing or the like are input to the entertainment device 12 from the operator via the controller 16, the CPU 401 computes the position of the object on the three-dimensional camera coordinates CC comprising the three orthogonal axes of V, U, and N, with the camera coordinates point of origin CO, and the orientation as to the viewpoint, based on the instructions. The coordinates point of origin CO of the camera coordinates CC is positioned in the later-described screen, in the middle thereof for example. Thus, the polygon apex data of the object defined by the coordinate values of the three orthogonal axes of X, Y, and Z is converted into the camera coordinates CC.

Figure 8:
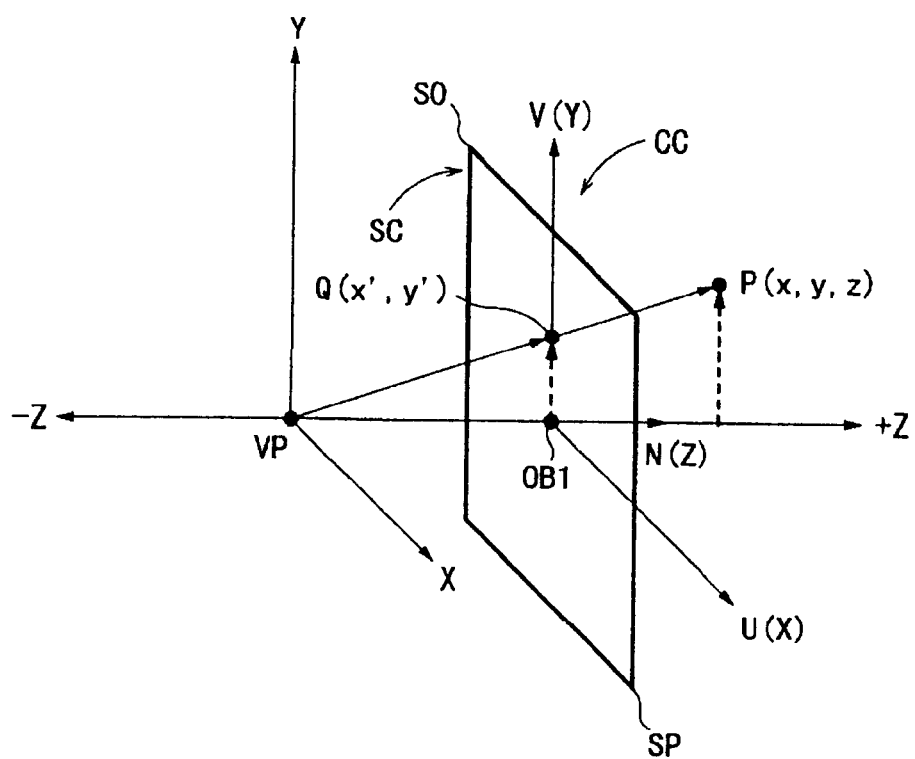
FIG. 8 is an explanatory diagram provided for correlated description of camera coordinates and screen coordinates.

Next, as schematically shown with one arrow line in FIG. 8, the polygon apex data P (x, y, z) following conversion to camera coordinates CC is converted into two-dimensional coordinates data Q (x', y') on the screen SP defined by screen coordinates SC having a screen coordinates point of origin SO (e.g., the upper left point on the screen SP), by transmittance conversion processing with the viewpoint VP as the reference.

The post-conversion two-dimensional X-Y coordinates data (x', y'), Z data (z), and texture data are supplied to the GS 404. The GS 404 performs rendering based on the post-conversion two-dimensional X-Y coordinates data (x', y') and Z data (z), and sequentially writes (draws) texture data to the RAM 405 serving as memory (in this case, the frame buffer), thereby carrying out the drawing processing. The texture data that is drawn is encoded by the encoder 407 as one frame of image completed by the drawing processing, and is supplied to the monitor 18 and displayed as a three-dimensional image or a two-dimensional image on the screen 19.

The entertainment system 10 according to the present embodiment is basically configured and operates as described above. Next, the contents of the pottery-making game program for throwing clay to make pottery, which runs on this entertainment system 10, will be described.

With this pottery-making game program, only operating input from the left and right sticks 70 and 72 which are the operating levers and the L3 and R3 buttons 70a and 72a, and operating input from the L1 and R1 buttons 53a and 54a serving as push button switches, is valid.

That is, with the pottery-making program, the digital signals Vd corresponding to the analog signals Vb (see FIG. 5) output when the operator operates the left and right sticks 70 and 72 (i.e., tilts the sticks) and the analog signals Va output when the operator operates (presses) the L3 and R3 buttons 70a and 72a, are each supplied as commands to the entertainment device 12 via the interface 128 as operating output values. The CPU 401 of the entertainment device 12 performs processing according to the program following the commands.

As for specific processing, force applied to the clay CL on the potter's wheel PW which is the object displayed on the screen 19 of the monitor 18 using the hands H which are the pressure applying means, is determined according to the operating output values Vb (Vd) output when operating the left and right sticks 70 and 72 and the L3 and R3 buttons 70a and 72a. The magnitude of force applied to the clay CL or the like by the hands H which are the force applying means, i.e., the magnitude of force commanded as to the hands H, is determined by making reference to an operation output values/force applying amount table 230 shown in FIG. 9 in the event of the left and right sticks 70 and 72, and is determined by making reference to an operation output values/force applying amount table 232 shown in FIG. 10 in the event of the L3 and R3 buttons 70a and 72a.

Figure 9:
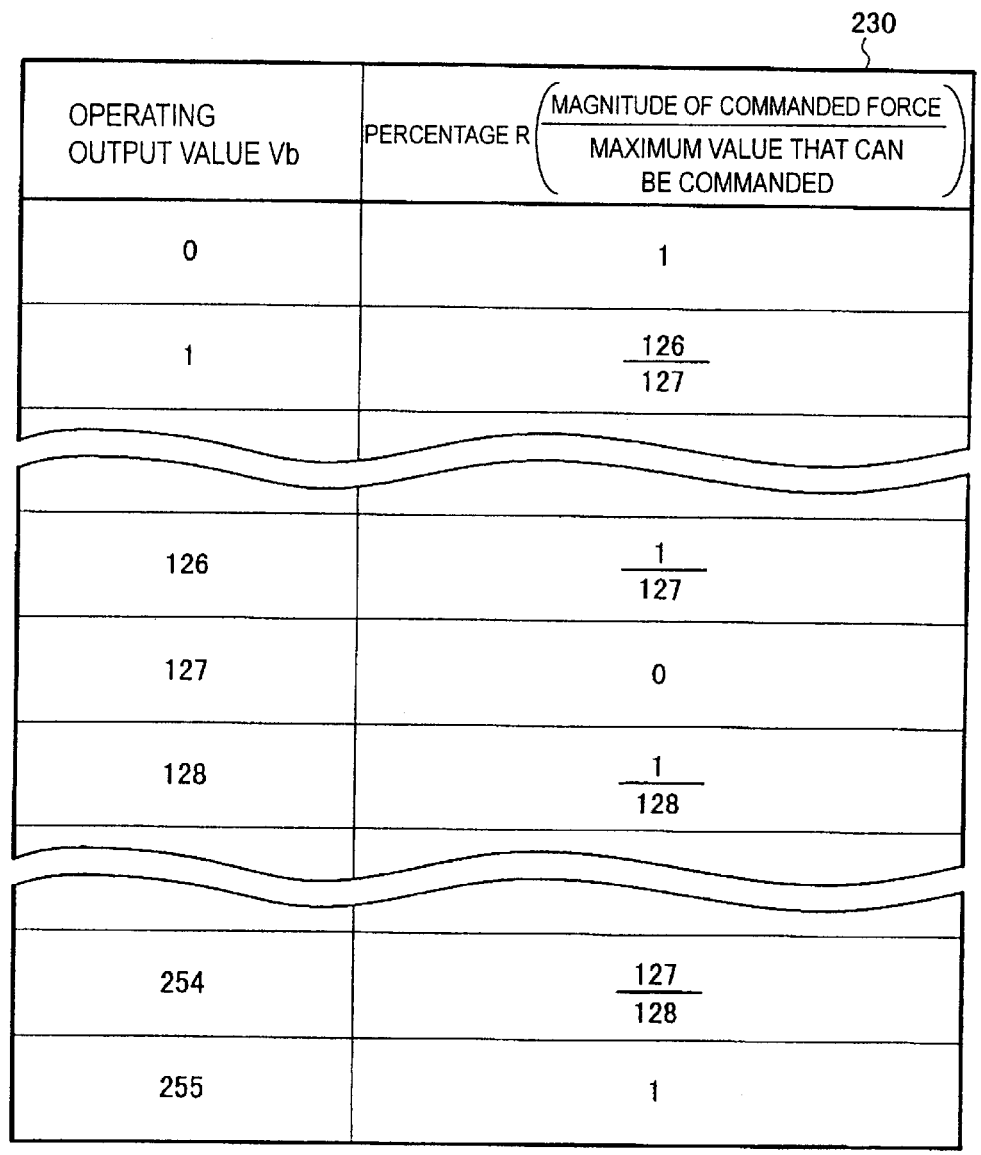
FIG. 9 is a table indicating the relation between the operations of the left or right stick and the percentage of magnitude of force.

With the operation output values/force applying amount table 230 shown in FIG. 9, in the event that the operating levers 202, i.e., the left and right sticks 70 and 72, are at the neutral position, the operating output value is Vb=127, so the percentage of force R (a value obtained by dividing the magnitude of force commanded by the maximum value that can be commanded) is the minimum value R=0, and on the other hand, in the event that the left and right sticks 70 and 72 are pressed or pulled down as far as they will go (i.e., maximum inclination), the operating output value is Vb=0 or Vb=255, so the percentage of force R is the maximum value R=1.

Note that with the operation output values/force applying amount table 230 relating to the left and right sticks 70 and 72, in the event that the operating output value is changing from Vb=127 toward 0, increase occurs at a rate of 1/127, and the event that the operating output value is changing from Vb=127 toward 255, the percentage of force R increases at a rate of 1/128.

Figure 10:
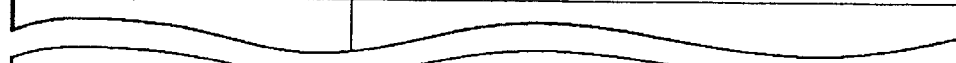
FIG. 10 is a table indicating the relation between the operations of the pressure-sensitive device and the percentage of magnitude of force.

On the other hand, the operation output values/force applying amount table 232 shown in FIG. 10 is arranged such that the operating output value is Va=0 in the event that the L3 and R3 buttons 70*a* and 72*a* are not pressed, so the percentage of force R (a value obtained by dividing the magnitude of force commanded by the maximum value that can be commanded) is the minimum value R=0, and on the other hand, the operating output value is Va=255 in the event that the L3 and R3 buttons 70*a* and 72*a* are pressed to the maximum, so the percentage of force R is the maximum value R=1.

In this case, with the operation output values/force applying amount table 232 relating to the L3 and R3 buttons 70*a* and 72*a*, in the event that the operating output value is changing from Va=0 toward 255, the percentage of force R increases at a rate of 1/255.

Figure 11:
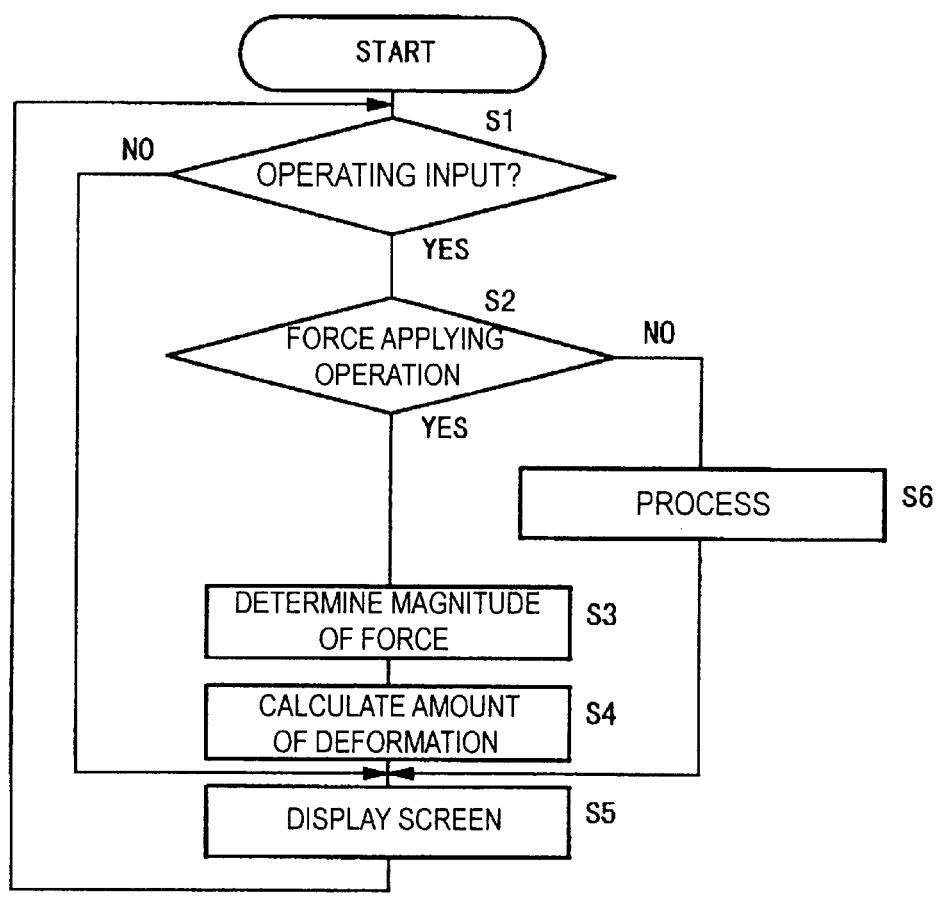
FIG. 11 is a flowchart indicating fundamental processing procedures for the primary components of the game program relating to an embodiment of the present invention.

FIG. 11 shows fundamental processing procedures for the primary components of this pottery-making game program. The game program is stored in an optical disk 20 which is a recording medium, written to RAM 402 by a predetermined amount via the DRV 410 and IOP 409 making up the entertainment device 12, read out by the CPU 401, and executed. Pictures (images) are displayed on the screen 19 of the monitor 18 via the GS 404 and encoder 407 as a result of the execution, and also audio is output from a speaker built into the monitor 18 or an external speaker 414, via the DRV 410, IOP 409, SP 412, and amplifier 413.

The fundamental processing procedures shown in FIG. 11 indicate processing partway through, following processing relating to the pottery-making game program having already been started. The judging entity is the CPU 401.

Figure 12:
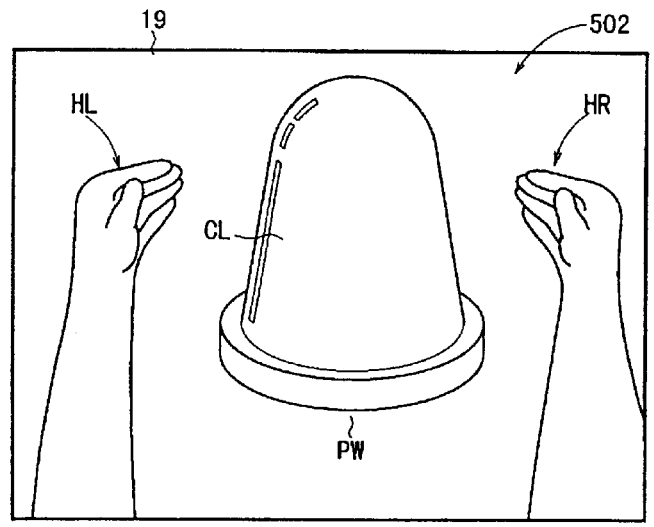
FIG. 12 is an explanatory diagram illustrating an image of a state wherein clay is prepared on a potter's wheel.

The image 502 shown in FIG. 12 is an image displayed on the screen 19 of the monitor 18 before starting the "coning process" in throwing pottery, with a hump of clay CL that has already been subjected to "wedging" and has plenty of water coated thereupon being placed on the center of the potter's wheel PW which rotates in the direction of the arrow. Left and right hands HL and HR are also displayed at a position removed from the clay CL. Now, "coning" is a process in preparing for throwing, to work out irregularities in the clay CL that were not worked out while wedging.

Figure 13:
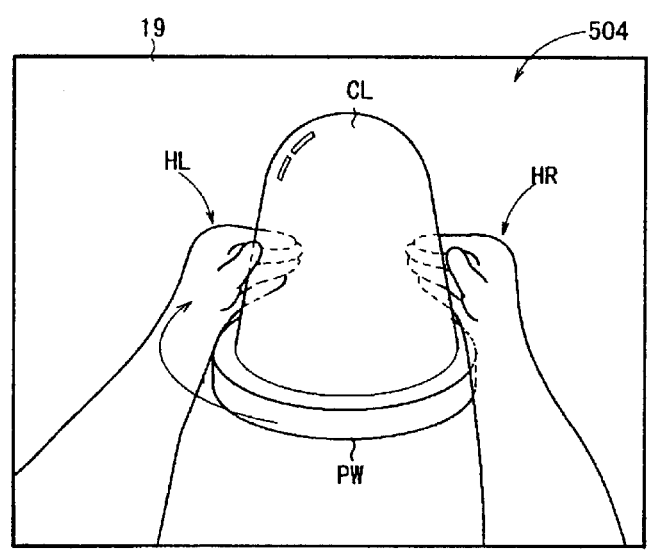
FIG. 13 is an explanatory diagram illustrating an image of a state immediately before coning the clay.

In the state wherein this image 502 is displayed, tilting the left and right sticks 70 and 72 (or, depending on the program, the left stick 70 alone) inwards (to the right in FIG. 1 for the left stick 70 and to the left for the right stick 72) causes the left and right hands HL and HR to move toward the clay CL, and as shown in the image 504 in FIG. 13, the palms of the hands H (HL and HR) are all but touching the clay CL. The processing of step S1 is performed in the state wherein this image 504 is displayed.

In step S1, judgment is made regarding whether or not there has been operating input by operating the controller 16, every 1/60 seconds for example, as this is the refresh rate of the image.

In the event that there has been operating input, judgment is made in step S2 whether or not the operating input is force applying operating input. In this case, operating input of any of the left and right sticks 70 and 72 or the L3 and R3 buttons 70*a* and 72*a*, is judged to be force applying operating input.

In the event that there has been operating input (operating output value Vd) of any of the left and right sticks 70 and 72 or the L3 and R3 buttons 70*a* and 72*a*, reference is made to the operation output values/force applying amount tables 230 and 232 mentioned above, shown in FIGS. 9 and 10, thereby determining the percentage of the magnitude of force to be commanded. Here, the case that there has been operating input of the left and right sticks 70 and 72 inward from the neutral position is supposed.

In this case, in step S3, reference is made to the operation output values/force applying amount table 230 shown in FIG. 9, and the percentage of the magnitude of force to be commanded to the hands H is detected from the operating output value Vb which is proportionate to the angle of inclination of the sticks. This percentage can also be obtained by a mathematical formula stored in the system beforehand, with the operating output value Vb as the input thereof.

In step S4, the force to be applied to the hands H is calculated by the mathematical formula stored in the system beforehand, based on this percentage, and the amount of deformation of the clay CL is calculated by a mathematical formula stored in the system beforehand, from this force.

In step S5, an image based on the calculated amount of deformation of the clay CL is generated, and displayed on the screen 19.

Figure 14:
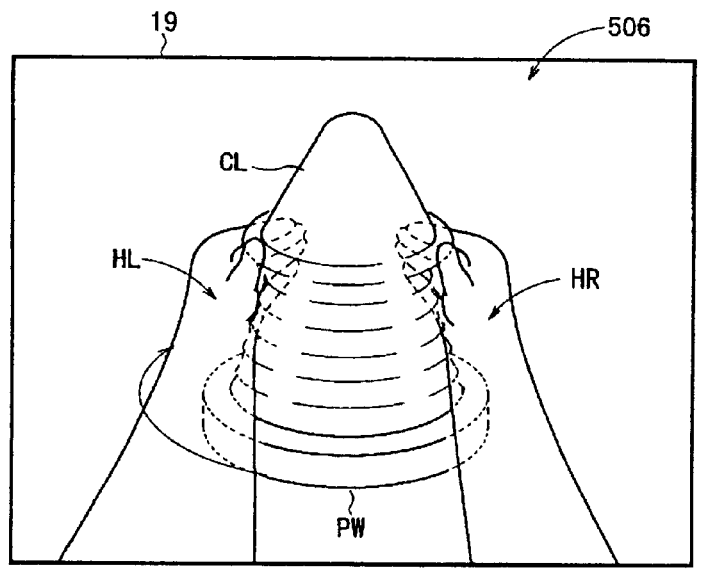
FIG. 14 is an explanatory diagram illustrating an image of how to cone the clay up during coning.
Figure 15:
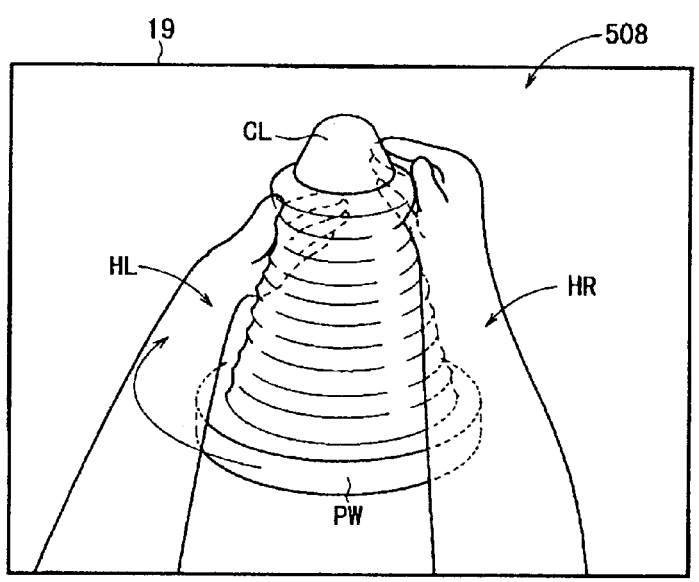
FIG. 15 is an explanatory diagram illustrating an image of the state of coning the clay up.

The image 506 in FIG. 14 shows an image partway through the process of "coning up" the clay. Pressing the clay CL with the right hand HR and pulling with the left hand HL causes the clay CL to naturally rise up due to centrifugal force. Though not listed in the flowchart shown in FIG. 11 to avoid complication description, performing such force applying operations, i.e., with the left stick 70 in the neutral position and the right stick 72 tilted inwards, tilting the left and right sticks 70 and 72 forwards (upwards in FIG. 1) results in the state illustrated in the image 508 shown in FIG. 15. This image 508 illustrates the state of coning the clay CL up using the entire surface of the palms of the hands H (HL and HR)

Figure 16:
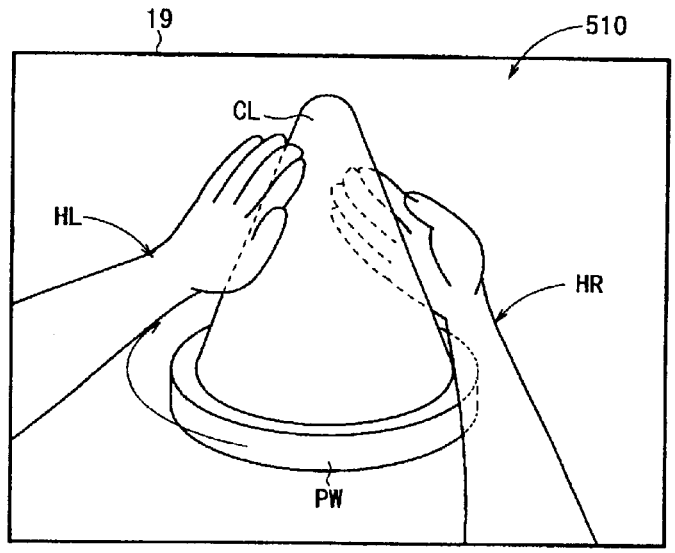
FIG. 16 is an explanatory diagram illustrating an image of the state wherein the clay has been coned up to the top.
Figure 17:
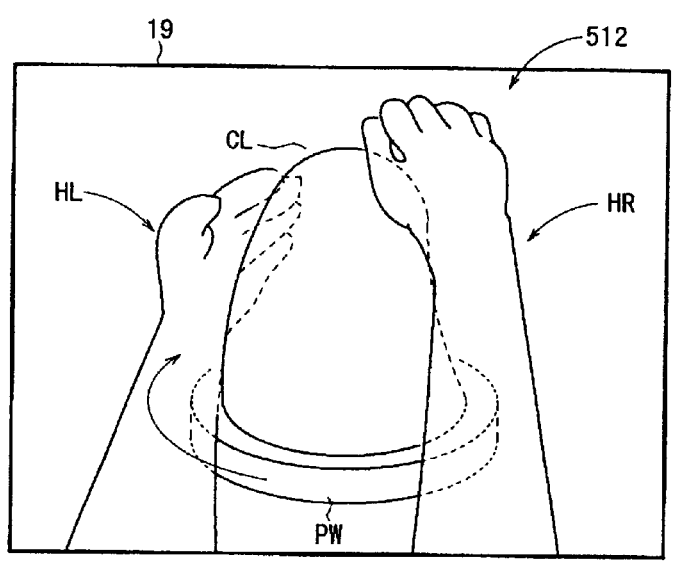
FIG. 17 is an explanatory diagram illustrating an image of the state of coning the clay down.

Now, an example of a general throwing process will be described. FIG. 16 shows an image 510 illustrating a state wherein the clay CL has been brought up to the top, and FIG. 17 shows an image 512 illustrating an action for taking the clay CL down using the entire surface of the palms of the hands H (HL and HR). Thus, coning works out irregularities in the clay CL that were not worked out while wedging, to facilitate the actual forming of the pottery PW in the throwing process.

Figure 18:
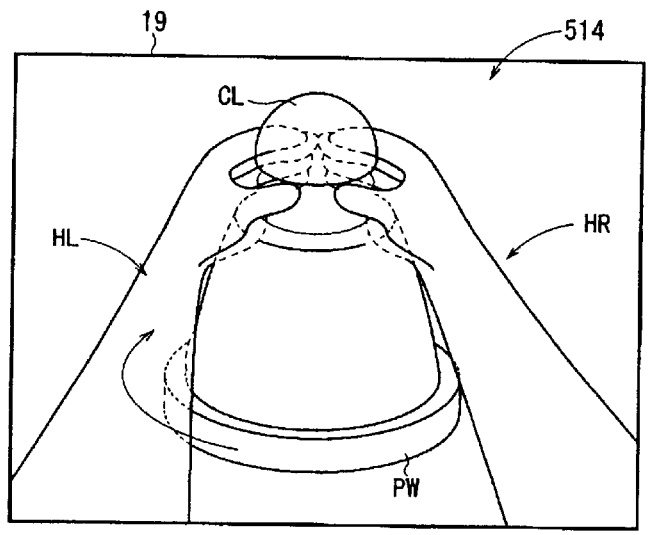
FIG. 18 is an explanatory diagram illustrating an image of the state of sectioning one piece of clay off of the hump.

Then, the turning process is carried out to form the pottery, and in the event of forming a cylindrical mug without handles, enough clay CL to form one item is sectioned off of the hump of clay CL (which has already been coned) by pinching with the fingers of both of the hands H (HL and HR) as illustrated by the image 514 shown in FIG. 18.

Figure 19:
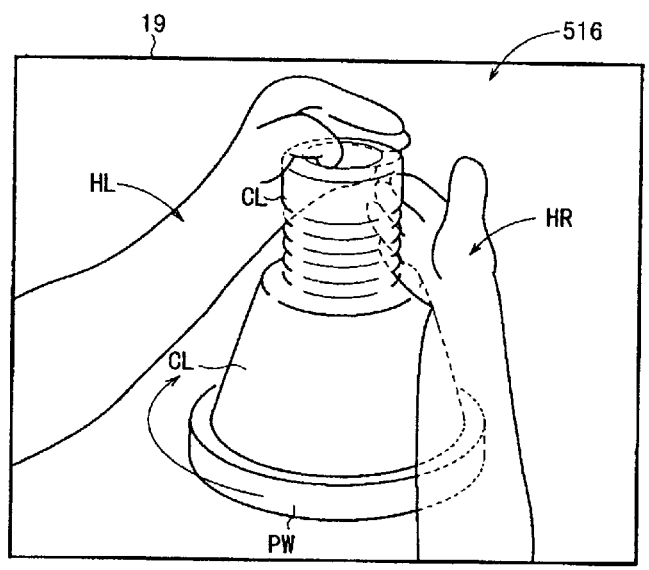
FIG. 19 is an explanatory diagram illustrating an image of the state of opening up the top of the piece sectioned off of the hump.

Next, as illustrated by the image 516 shown in FIG. 19, the clay CL that has been section off is held between the fingers and palms of the hands H (HL and HR), and the top is opened up. At this time, the motions of the fingers of the left hand HL correspond to the pressing operation of the L3 button 70*a*.

Though not shown in the drawings, a process is then performed wherein the clay CL is drawn upwards by tightening on the clay CL with the fingers of the left hand HL while maintaining the cylindrical form with the right hand HR, thereby forming a cylindrical item with a desired shape.

Figure 20:
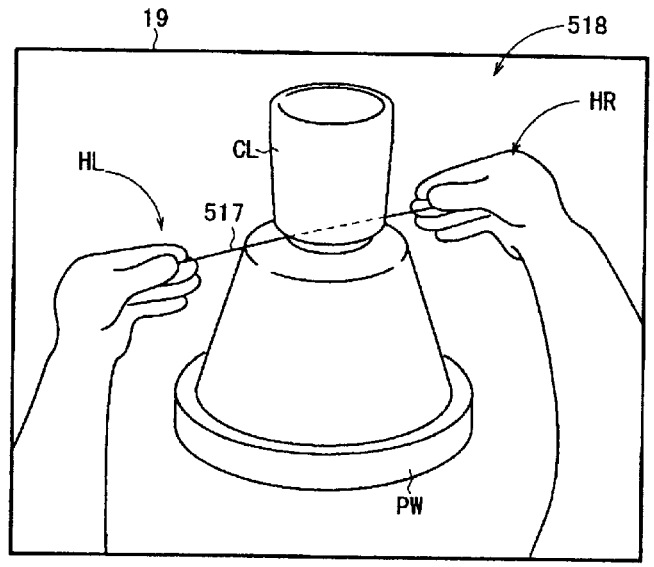
FIG. 20 is an explanatory diagram illustrating an image of the state of cutting a finished piece off of the hump using a cut-off string.

FIG. 20 shows an image 518 illustrating the time of placing a cut-off string 517, which is a type of tool, at the base of the clay CL which has been formed into the desired shaped cylindrical form, and removing the right hand HR for an instant.

Figure 21:
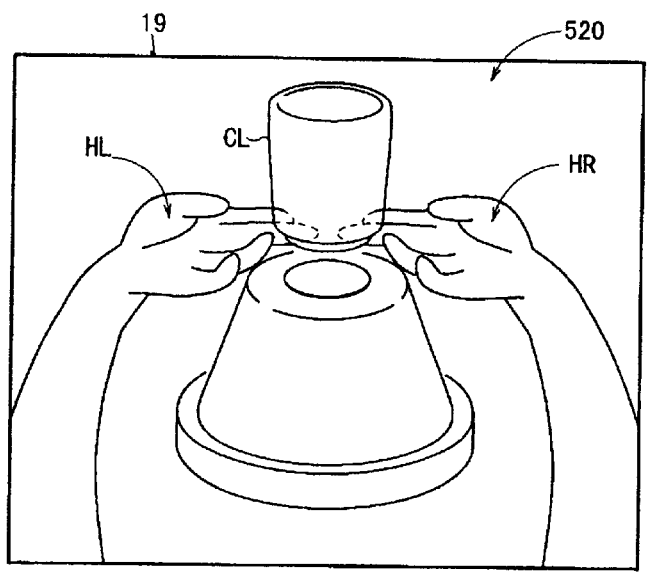
FIG. 21 is an explanatory diagram illustrating an image of the state of lifting the finished piece off.

FIG. 21 shows an image 520 illustrating cupping both hands H (HR and HL) immediately before gently lifting the clay CL, which has been formed into the shape of a mug without handles which is the desired article, off of the hump.

Thus, the throwing process is completed. Then, the clay CL which has been formed into the shape of a mug is subjected to the steps of a working and decorating step (including trimming, engraving, and other like processes for changing the shape and/or texture of the shaped clay article but not including applying colors or glaze), a drying step, a bisque-firing step, an underglazing step, a glazing step, and a main firing step (dyeing and firing), followed by a kiln-opening step. Thus, the pottery-making process ends, and the mug is completed.

Figure 22:
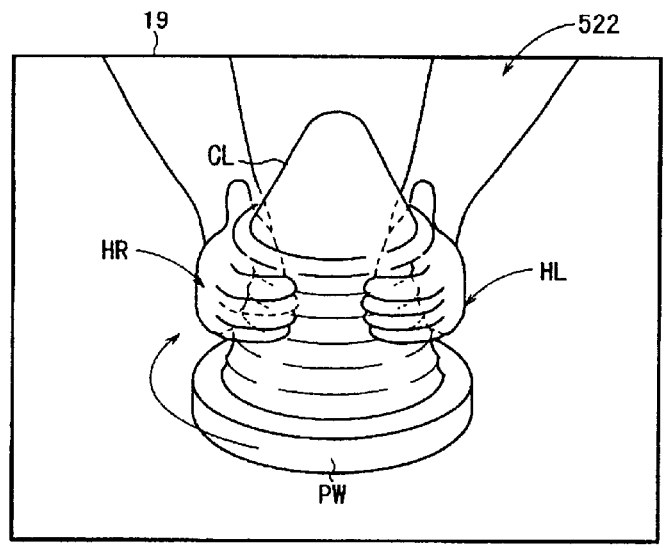
FIG. 22 is an explanatory diagram illustrating the image shown in FIG. 13 after viewpoint changing processing.

Now, returning to the flowchart shown in FIG. 11, the flow returns to step S1 following the image display processing in step S5, and in the event that there is no operating input in the processing in step S1, the image display processing in step S5 is repeated. Also, even in the event that there is operating input in the processing in step S1, if the judgment in step S2 does not hold and there has been operation other than that of any of the left and right sticks 70 and 72 or the L3 and R3 buttons 70a and 72a, the processing of step S6 is performed. The processing in this step S6 consists of switching the viewpoint in the event that the operating input in step S1 is operating of the L1 and R1 buttons 53a and 54a for example, following which the flow proceeds to the processing in step 5, and an image 522 is displayed wherein the hands H (HL and HR) of the operator can be viewed as if it were from the eyes of another viewer, as shown in FIG. 22.

Also, the processing in this step S6 consists of quitting the pottery-making game in the event that the operating input in step S1 is operating of the reset button 24 for example. Further, in the event that the operating input in step S1 is operating of the analog mode switch 74 for example, the step S6 consists of appropriating the functions appropriated to the left and right sticks 70 and 72, to the first and second operating portions 51 and 52, appropriating the functions appropriated to the L3 and R3 buttons 70a and 72a, to the L1 and R1 buttons 53a and 54a, and proceeding to the image display processing of step S5.

Figure 23:
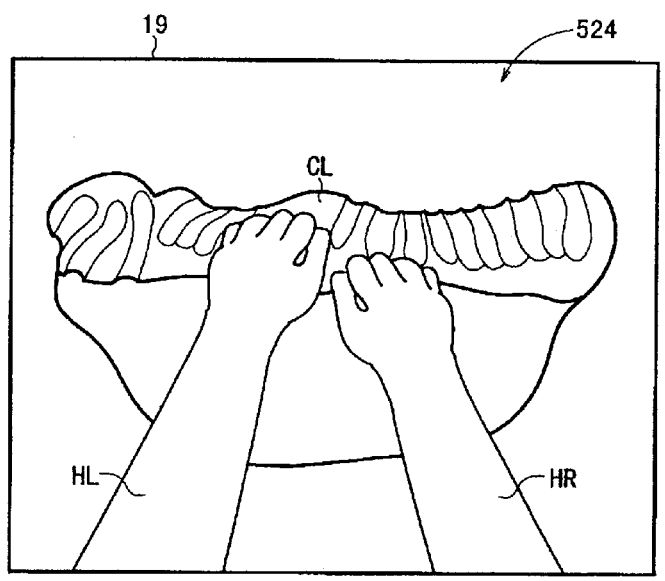
FIG. 23 is an explanatory diagram illustrating an image of the state of performing pre-wedging.
Figure 24:
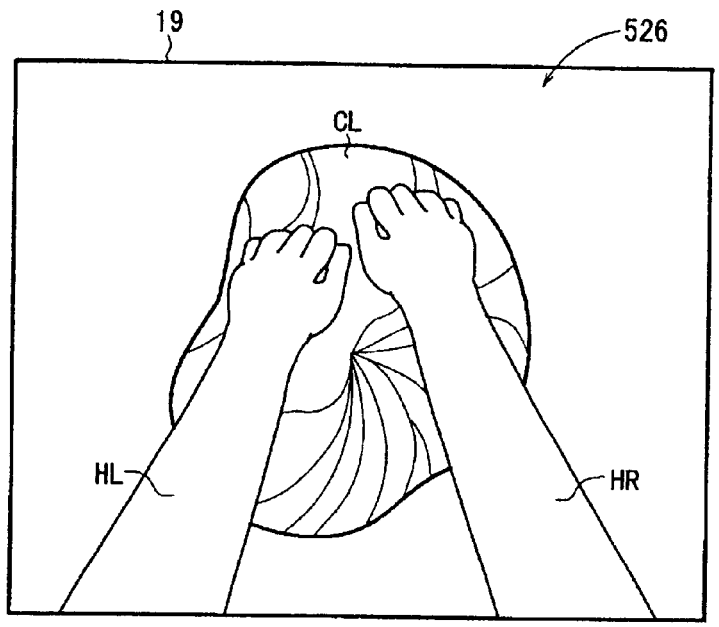
FIG. 24 is an explanatory diagram illustrating an image of the state of performing spiral wedging.

Note that while in the above embodiment, description has been made with reference to deforming clay CL rotating on a potter's wheel PW by operating the left and right sticks 70 and 72 or the L3 and R3 buttons 70a and 72a, the same processing procedures can be used to determine the magnitude of force and deformation of the clay CL in the "pre-wedging" process for making the consistency of the clay CL uniform, illustrated in the image 524 shown in FIG. 23 or in the "spiral wedging" process for working out any remaining air in the clay CL, illustrated in the image 526 shown in FIG. 24.

Thus, the embodiment described above has a step S3 for determining the force applied to clay CL displayed on the screen 19 with the hands H according to the operating output value Vb output by operating the left and right sticks 70 and 72 or the like, so the magnitude of force applied on the screen 19 can be controlled with greater precision, by the simple operations of operating the left and right sticks 70 and 72 or the like.

Comparing this with the conventional art, operations closer to actual sensations (or feelings) can be realized as compared to the conventional art wherein on/off switches are simply turned on repeatedly and force is determined by the length of time or the timing of pressing the buttons. Also, the operations of operating the left and right sticks 70 and 72 or the like is reflected in the magnitude of force applied on the screen 19 in real-time, so operability is greater than that of the conventional art. Accordingly, the present embodiment is a more user-friendly interface as compared to the conventional art, which results in the game being more interesting and enjoyable.

Incidentally, the force is determined according to the amount of change per unit time of the operating output value Vd (i.e., the amount of change represented by (Vd2−Vd1)/Δt, wherein Vd1 represents the operating output value before unit time Δt and Vd2 represents the current operating output value), so force can be generated in a manner that matches the sensations of the operator in an even greater manner. More specifically, in the event that the previous input value is 100 and the current input value is 50, for example, the percentage of change is 50%, so the magnitude of force is set at 50% of the previous magnitude of force.

Also, the amount of change of the clay CL which is the object is determined by the force determined according to the operating output value Vd, so the clay CL can be deformed with a delicate touch. In other words, realistic games and simulations can be realized wherein the force applied to an object such as clay CL or the like wherein the form thereof readily changes (readily deforms) by human strength or tools used by humans is delicately changed, while applying actions to the object such as kneading, wedging, crumbing, rubbing, working, and so forth.

Also note that, while the above embodiment has been described with reference to an example of pottery-making wherein the clay CL is worked to complete an article, but the present invention is by no means restricted to clay CL; rather, the present invention is applicable to any object having such a working step, and can be applied to a wide variety of game or simulation programs, such as making udon noodles, making soba noodles, making pasta, making naan bread, and so forth. That is to say, according to the present invention, game programs with a new sort of entertainment which has not been realized heretofore can be realized. In this case, the force applying means may be tools such as pallet blades, spatulas, rolling pins, and so forth, or the force applying means may be human hands using such tools.

Figure 25:
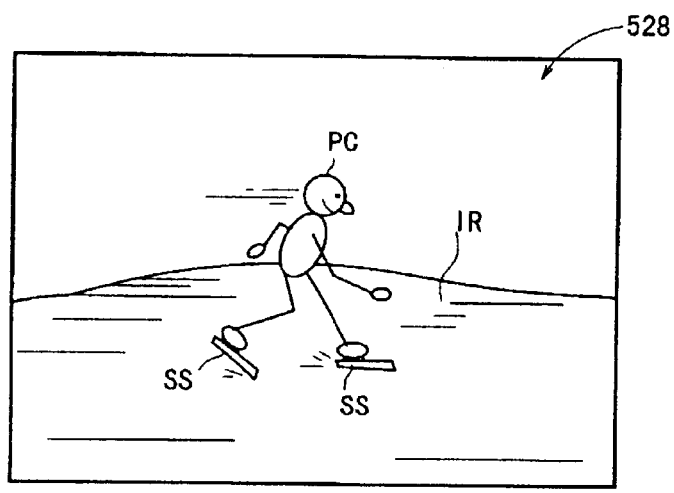
FIG. 25 is an explanatory diagram illustrating an image of the state of ice skating.
Figure 26:
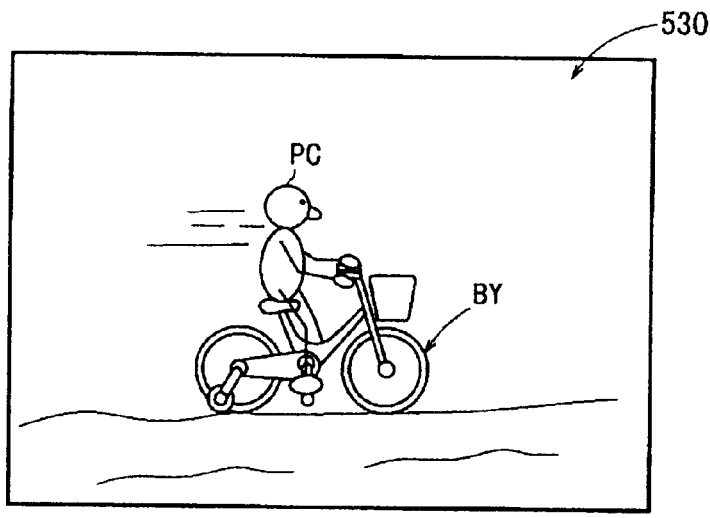
FIG. 26 is an explanatory diagram illustrating an image of the state of pedaling a bicycle.
Figure 27:
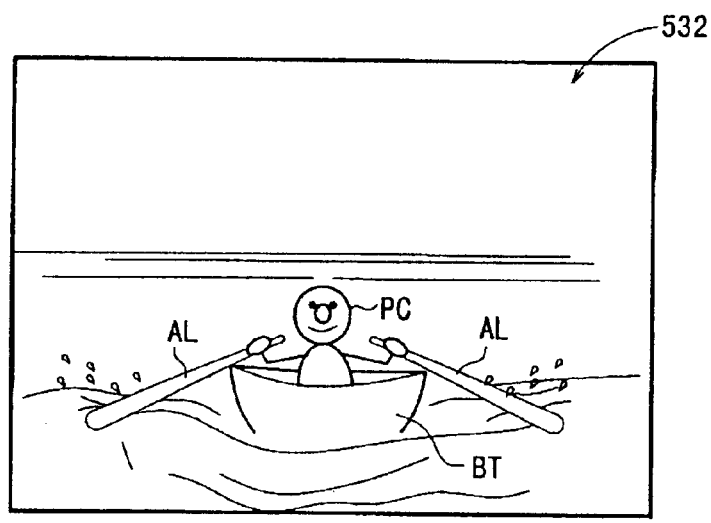
FIG. 27 is an explanatory diagram illustrating an image of the state of rowing a rowboat.

Also, various applications and modifications of the present invention may be made besides the above-described embodiment, without departing from the spirit or scope of the present invention, wherein the force that characters exert is determined according to the operating output value Vd of the left and right sticks 70 and 72 or the like, as illustrated by the images 528, 530, and 532, shown in FIGS. 25 through 27, such as the force of a character PC which skates kicking a skating rink IR with skates SS (FIG. 25), the force of a character PC on pedals while pedaling a bicycle BY (FIG. 26), and the strength of the arms of a character PC rowing a rowboat BT with oars AL (FIG. 27), and so forth.

As described above, according to the present invention, force applied to an object displayed on a screen from force applying means is determined according to operating output values output at the time of operating an operating lever, and thus is advantageous in that force can be controlled in a delicate manner with the simple operations of the operator operating an operating lever.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An entertainment system, comprising:
   a controller having a first operating lever operable to output signals based on a degree of inclination of said first operating lever, each degree of inclination corresponding to one of a first plurality of predetermined magnitudes of force;
   an entertainment device connected to said controller for processing the signals output from said first operating lever; and
   a display device connected to said entertainment device to output images based on the signals processed by said entertainment device, said display device displaying an image of a first object and an image of a second object on a screen, wherein movement of said first operating lever to a selected degree of inclination results in movement of said image of said second object so that said image of said second object applies a first force to said image of said first object corresponding to one of said first plurality of predetermined magnitudes of force.

2. The entertainment system of claim 1, wherein
   said display device further displays an image of a third object movable to apply a second force to said image of said first object, and
   said controller includes a second operating lever operable to output signals based on a degree of inclination of said second lever, each degree of inclination corresponding to one of said first plurality of predetermined magnitudes of force.

3. The entertainment system of claim 2, wherein said image of said second object is an image of a right-hand shape and said image of said third object is an image of a left-hand shape.

4. The entertainment system of claim 2, wherein one of said images of said second and third objects displayed on said screen corresponds to said first operating lever operated by a right hand of a user, and another one of said images of said second and third objects displayed on said screen corresponds to said second operating lever operated by a left hand of the user.

5. The entertainment system of claim 2, wherein said images of said second and third objects cooperate with each other to apply said first and second forces to said image of said first object.

6. The entertainment system of claim 1, wherein said image of said second object applies said first force to said image of said first object by means of a tool displayed on said screen.

7. The entertainment system of claim 1, wherein said first force applied by said image of said second object deforms said first object by a degree of deformation, said degree of deformation varying based on the signals output from said first operating lever.

8. The entertainment system of claim 1, wherein said first force applied by said image of said second object causes said image of said first object to be changed into arbitrary shapes according to the signals output from said first operating lever.

9. The entertainment system of claim 1, wherein
   said first operating lever is further operable to output other signals based on an amount of pressing force applied to said first operating lever in an axial direction of said first operating lever, said amount of pressing force corresponding to one of a second plurality of predetermined magnitudes of force, and
   said first force applied to said image of said first object by said image of said second object corresponds to both said one of said first plurality of predetermined magnitudes of force and said one of said second plurality of predetermined magnitudes of force.

10. The entertainment system of claim 1, wherein said entertainment device determines an amount of change per unit time of the signals output from said first operating lever each time the signals are output from said first operating lever.

11. The entertainment system of claim 10, wherein said first force applied to said image of said first object further depends on said amount of change per unit time of the signals output from said first operating lever.

12. A recording medium recorded with a computer program for manipulating images displayed on a display device based on the movement of an operating lever, the program comprising:
    causing the display device to display an image of a first object and an image of a second object;
    receiving signals output from the operating lever, the signals being based on a degree of inclination of the operating lever, each degree of inclination corresponding to one of a first plurality of predetermined magnitudes of force;
    processing the signals output from the operating lever to determine the one of the first plurality of predetermined magnitudes of force corresponding to a selected degree of inclination of the operating lever; and
    manipulating the image of the second object so that the image of the second object applies a force to the image of the first object corresponding to the one of the first plurality of predetermined magnitudes of force.

13. The recording medium of claim 12, wherein the program further comprises:
    receiving other signals output from the operating lever, the other signals being based on an amount of pressing force applied to the operating lever in an axial direction of the operating lever, the amount of pressing force corresponding to one of a second plurality of predetermined magnitudes of force;
    processing the other signals output from the operating lever to determine the one of the second plurality of predetermined magnitudes of force corresponding to the amount of pressing force applied to the operating lever;
    manipulating the image of the second object so that the force applied to the image of the first object by the image of the second object corresponds to both the one of the first plurality of predetermined magnitudes of force and the one of the second plurality of predetermined magnitudes of force.

14. An entertainment system, comprising:
a controller having an operating lever operable to output signals based on a degree of inclination of said operating lever, each degree of inclination corresponding to one of a first plurality of predetermined magnitudes of force;
an entertainment device connected to said controller, said entertainment device including a recording medium recorded with a computer program for processing the signals output from said operating lever, said program determining said one of said first plurality of predetermined magnitudes of force corresponding to the signals output from said operating lever; and
a display device connected to said entertainment device to output images based on the signals processed by said computer program, said display device displaying an image of a first object and an image of a second object on a screen, wherein movement of said operating lever to a selected degree of inclination results in movement of said image of said second object so that said image of said second object applies a force to said image of said first object corresponding to said one of said first plurality of predetermined magnitudes of force.

15. The entertainment system of claim 14, wherein said program further determines an amount of change per unit time of the signals output from said operating lever each time the signals are output from said operating lever, and said force applied to said image of said first object further depends on said amount of change per unit time of the signals output from said operating lever.

16. The entertainment system of claim 14, wherein
said operating lever is further operable to output other signals based on an amount of pressing force applied to said operating lever in an axial direction of said operating lever, said amount of pressing force corresponding to one of a second plurality of magnitudes of force, and
said force applied to said image of said first object by said image of said second object corresponds to both said one of said first plurality of predetermined magnitudes of force and said one of said second plurality of predetermined magnitudes of force.

17. The entertainment system of claim 14, wherein said image of said second object deforms said image of said first object by a degree of deformation, said degree of deformation varying based on the signals output from said operating lever.

18. The entertainment system of claim 14, wherein said image of said first object is clay, and said image of said second object is a hand.

19. The entertainment system of claim 14, wherein said image of said second object is a human hand or tool used by a human, and said image of said first object has a shape that is readily deformed by said human hand or said tool.

20. An entertainment system, comprising:
a controller having an operating lever operable to output signals based on a degree of inclination of said operating lever, each degree of inclination corresponding to one of a first plurality of predetermined magnitudes of force;
an entertainment device connected to said controller for outputting operating requests by an operator;
a display device connected to said entertainment device for outputting images, said display device displaying an image of a first object and an image of a second object on a screen, wherein movement of said operating lever to a selected degree of inclination results in movement of said image of said second object so that said image of said second object applies a force to said image of said first object corresponding to one of said first plurality of predetermined magnitudes of force;
a program executing device connected to said controller for outputting signals to said display device, said program executing device including:
a storing unit storing a program for processing the signals output from said operating lever, wherein said program determines said force applied to said image of said first object by said image of said second object based on the signals output from said operating lever; and
an executing unit for reading and executing said program stored in said storing unit.

21. A method of using an operating lever to manipulate images on a display device, the method comprising:
displaying an image of a first object and an image of a second object on the display device;
moving the operating lever to a selected degree of inclination, each degree of inclination corresponding to one of a first plurality of predetermined magnitudes of force;
outputting signals from the operating lever based on the selected degree of inclination of the operation lever;
processing the signals output from the operating lever to determine the one of the first plurality of predetermined magnitudes of force corresponding to the selected degree of inclination; and
moving the image of the second object so that the image of the second object applies a force to the image of the first object corresponding to the one of the first plurality of predetermined magnitudes of force.

22. The method of claim 21, further comprising:
applying an amount of pressing force to the operating lever in an axial direction of the operating lever, each amount of pressing force corresponding to one of a second plurality of predetermined magnitudes of force;
outputting other signals from the operating lever based on the amount of pressing force applied to the operating lever; and
processing the other signals output from the operating lever to determine the one of the second plurality of predetermined magnitudes of force corresponding to the amount of pressing force,
wherein the force applied by the image of the second object to the image of the first object corresponds to both the one of the first plurality of predetermined magnitudes of force and the one of the second plurality of predetermined magnitudes of force.

23. The method of claim 21, further comprising determining an amount of change per unit time of the signals output from the operating lever each time the signals are output from the operating lever, wherein said force applied to said image of said first object further depends on said amount of change per unit time of the signals output from said operating lever.

24. The method of claim 21, further comprising determining a degree of deformation of the image of the first object based on the signals output from the operating lever.

25. The method of claim 21, wherein the image of the first object is an image of clay, and the image of the second object is an image of a hand.

26. The method of claim 21, wherein the image of the second object is a human hand or tool used by a human, and the image of the first object has a shape that is readily deformed by the human hand or the tool.

* * * * *